(12) United States Patent
Sawada et al.

(10) Patent No.: US 11,724,763 B2
(45) Date of Patent: Aug. 15, 2023

(54) SIDE COWL

(71) Applicant: SUZUKI MOTOR CORPORATION, Hamamatsu (JP)

(72) Inventors: Fujimi Sawada, Hamamatsu (JP); Yuki Mochizuki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 8 days.

(21) Appl. No.: 17/462,277

(22) Filed: Aug. 31, 2021

(65) Prior Publication Data

US 2022/0073163 A1 Mar. 10, 2022

(30) Foreign Application Priority Data

Sep. 7, 2020 (JP) ................................ 2020-149716

(51) Int. Cl.
*B62J 17/00* (2020.01)

(52) U.S. Cl.
CPC ..................................... *B62J 17/00* (2013.01)

(58) Field of Classification Search
CPC ... B62J 17/00; B62J 17/02; B62J 17/04; B62J 17/10; B62K 11/00
USPC ....................................................... 296/78.1
See application file for complete search history.

(56) References Cited

U.S. PATENT DOCUMENTS

| | | | |
|---|---|---|---|
| 2011/0155493 A1 | 6/2011 | Kogo et al. | |
| 2013/0057016 A1* | 3/2013 | Yamada | B62J 17/02 296/78.1 |

FOREIGN PATENT DOCUMENTS

| | | | | |
|---|---|---|---|---|
| EP | 1514782 A2 * | 3/2005 | ............. | B62J 17/00 |
| EP | 2042415 A1 | 4/2009 | | |
| EP | 2394893 A2 | 12/2011 | | |
| EP | 2428437 A1 | 3/2012 | | |
| EP | 2910459 A1 * | 8/2015 | ............. | B62J 17/02 |
| EP | 3348462 A1 * | 7/2018 | | |
| JP | S58-167272 A | 10/1983 | | |
| JP | 2005-178621 A | 7/2005 | | |
| JP | 2010-234901 A | 10/2010 | | |
| JP | 2013071552 A * | 4/2013 | | |
| JP | 2014069709 A * | 4/2014 | .......... | B62D 25/081 |
| WO | 2019065485 A1 | 4/2019 | | |

OTHER PUBLICATIONS

Machine translation of JP-2013071552-A.*
Extended European Search Report issued in EP 21193965.7 dated Jan. 19, 2022.
Office Action issued in EP 21193965.7 dated Mar. 17, 2023.

* cited by examiner

*Primary Examiner* — Dennis H Pedder
*Assistant Examiner* — Kevin P Weldon
(74) *Attorney, Agent, or Firm* — Troutman Pepper Hamilton Sanders LLP

(57) ABSTRACT

A side cowl configured to cover a vehicle side portion of a saddle-ridden vehicle is provided. The side cowl includes a convex portion elongating in an upper-lower direction and protruding outward in a vehicle width direction with respect to a cowl outer surface. The convex portion is formed on the cowl outer surface at a downstream side of traveling wind that flows on the cowl outer surface.

9 Claims, 8 Drawing Sheets

SIDE COWL

CROSS-REFERENCE TO RELATED APPLICATIONS

The disclosure of Japanese Patent Application No. 2020-149716 filed on Sep. 7, 2020, the contents of which is incorporated herein by reference in its entirety.

BACKGROUND

The present invention relates to a side cowl.

As a saddle-ridden vehicle such as a motorcycle, a vehicle is known in which a vehicle front portion is covered by a front cowl and a vehicle side portion is covered by a side cowl (for example, see JP-A-2005-178621). A streamline-shaped front cowl and streamline-shaped side cowls are integrally attached to a saddle-ridden vehicle described in Patent Literature 1, and traveling wind flows from a front side of the vehicle to a rear side of the vehicle along outer surfaces of the front cowl and the side cowls. Because of a windbreak effect of the front cowl and the side cowls, an air resistance received by the vehicle from the traveling wind is reduced so that stable traveling is enabled, and hitting of the traveling wind on an occupant is reduced so that comfortable driving of the saddle-ridden vehicle is implemented.

SUMMARY

According to one advantageous aspect of the present invention, there is provided a side cowl configured to cover a vehicle side portion of a saddle-ridden vehicle, including a convex portion, elongating in an upper-lower direction, protruding outward in a vehicle width direction with respect to a cowl outer surface, and formed on the cowl outer surface at a downstream side of traveling wind that flows on the cowl outer surface.

DETAILED DESCRIPTION OF EXEMPLIFIED EMBODIMENTS

Although the front cowl and the side cowls described in Patent Literature 1 weaken the hitting of the traveling wind on the occupant, further comfort is required when driving the saddle-ridden vehicle. Particularly, there is a problem that the traveling wind strongly hits a portion of the occupant that protrudes from the side cowl, and comfort when driving the saddle-ridden vehicle is reduced.

The present invention has been made in view of the above circumstances, and an object thereof is to provide a side cowl that can improve comfort during driving while reducing an air resistance due to traveling wind.

A side cowl according to one aspect of the present invention covers a vehicle side portion of a saddle-ridden vehicle, and traveling wind flows along a cowl outer surface. A convex portion that elongates in an upper-lower direction and protrudes outward in a vehicle width direction with respect to the cowl outer surface is formed on a downstream side of the traveling wind on the cowl outer surface, and a flow of the traveling wind along the cowl outer surface is separated by the convex portion. Since the traveling wind is diffused outward in the vehicle width direction at the rear side of the convex portion, hitting of the traveling wind on a portion of an occupant that protrudes from the side cowl is softened. An air resistance is reduced by the side cowl, traveling is stabilized, a strong local wind pressure on the occupant is prevented, and comfort during driving is not impaired.

Figure 1:
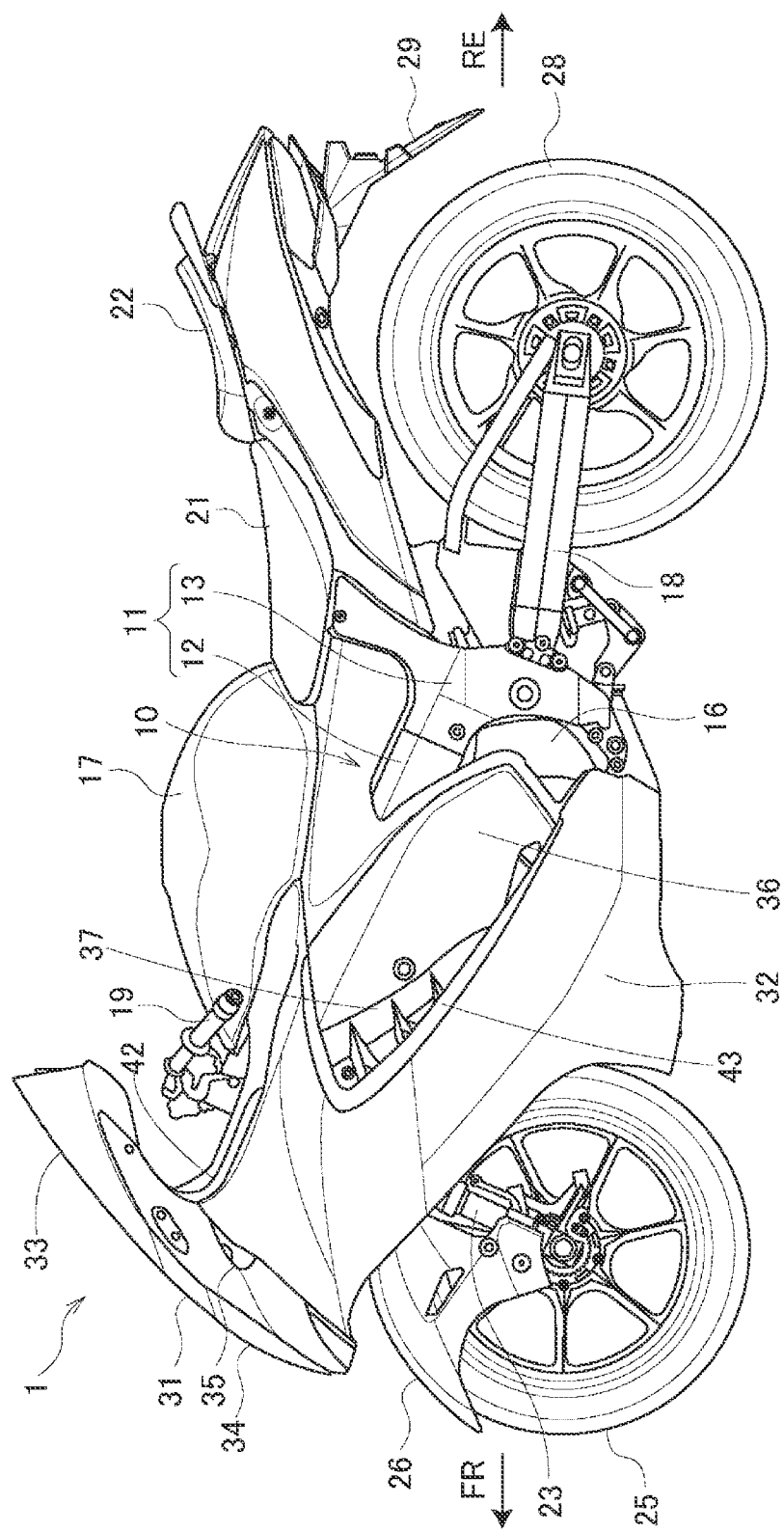
FIG. 1 is a left side view of a saddle-ridden vehicle according to the present embodiment.

Hereinafter, the present embodiment will be described in detail with reference to the accompanying drawings. FIG. 1 is a left side view of the saddle-ridden vehicle according to the present embodiment. Further, in the following drawings, an arrow FR indicates a vehicle front side, an arrow RE indicates a vehicle rear side, an arrow L indicates a vehicle left side, and an arrow R indicates a vehicle right side.

As shown in FIG. 1, a saddle-ridden vehicle 1 is configured by mounting various components such as an engine 16 and an electric system on a twin-spar vehicle body frame 10 formed by aluminum casting. The vehicle body frame 10 includes a pair of main frames 11 that branch from a head pipe (not shown) to left and right sides and extend to a rear side of the vehicle, and a pair of down frames (not shown) that branch from the head pipe to the left and right sides and extend downward. A rear portion of the engine 16 is supported by the pair of main frames 11, and a front portion of the engine 16 is supported by the pair of down frames. The engine 16 is supported by the vehicle body frame 10, so that rigidity of the entire vehicle is secured.

Front portions of the main frames 11 serve as tank rails 12 located above the engine 16, and a fuel tank 17 is supported by the tank rails 12. Rear portions of the main frames 11 serve as body frames 13 located behind the engine 16, and swing arms 18 are swingably supported at substantially intermediate positions of the body frames 13 in an upper-lower direction. A seat rail (not shown) and a back stay (not shown) extend rearward from upper portions of the body frames 13. On the seat rail, a rider seat 21 and a pillion seat 22 are supported behind the fuel tank 17.

A pair of front forks 23 are steerably supported on the head pipe via a steering shaft (not shown). A front wheel 25 is rotatably supported by lower portions of the front forks 23, and an upper portion of the front wheel 25 is covered by a front fender 26. The swing arms 18 extend from the body frames 13 toward a rear side of the vehicle. A rear wheel 28 is rotatably supported by rear ends of the swing arms 18, and an upper side of the rear wheel 28 is covered by a rear fender 29. The engine 16 is coupled to the rear wheel 28 via a chain-drive transmission mechanism, and power is transmitted from the engine 16 to the rear wheel 28 via the transmission mechanism.

Various cover members are attached to the vehicle body frame 10 of the saddle-ridden vehicle 1 as a vehicle body exterior. For example, a front surface side of the vehicle front portion is covered by a front cowl 31, and a screen 33 is provided on an upper portion of the front cowl 31. Further, a side surface side of the vehicle front portion is covered by a pair of side cowls 32. The front cowl 31, the screen 33, and the pair of side cowls 32 form a streamlined shape that reduces an air resistance received from the traveling wind on the vehicle front portion. Since these cover members cover a front side of the occupant and serve as a wind shield, hitting of the traveling wind on the occupant during traveling of the vehicle is fairly reduced.

However, the front cowl 31, the screen 33, and the pair of side cowls 32 do not completely protect the occupant from the traveling wind. For example, the traveling wind hits portions such as elbows, knees, thighs, and shins of the occupant that protrude from the pair of side cowls 32. As a distance from vicinities of outer surfaces of the side cowls 32 increases, the traveling wind becomes strong, and the occupant is likely to feel uncomfortable due to a strong local wind pressure. Therefore, in the present embodiment, an upper edge cover 42 and a rear edge cover 43 are provided on the side cowl 32, and the flow of the traveling wind along the outer surface of the side cowl 32 is diffused toward the outer side in the vehicle width direction to soften the hitting of the traveling wind on the occupant.

Figure 2:
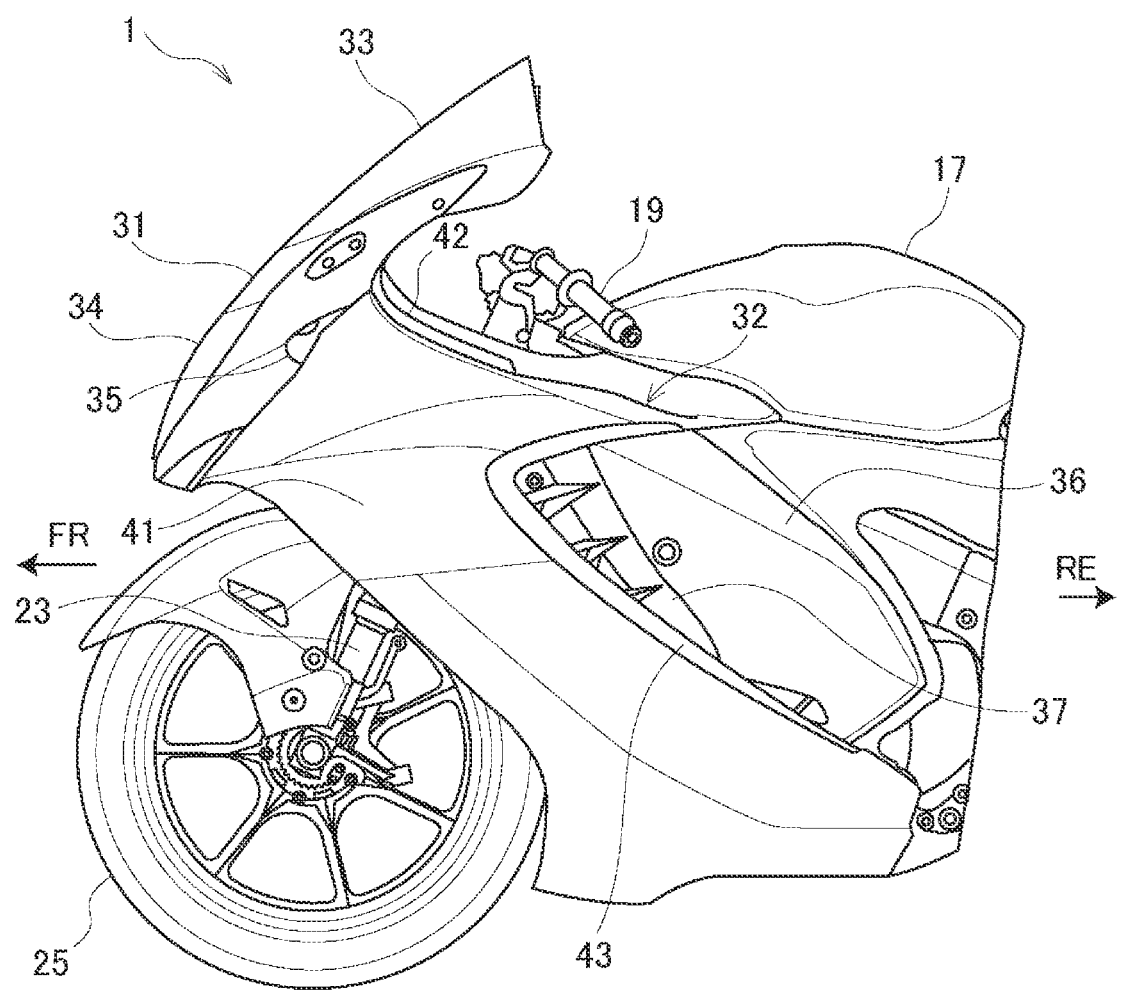
FIG. 2 is a side view of a vehicle front portion according to the present embodiment.
Figure 3:
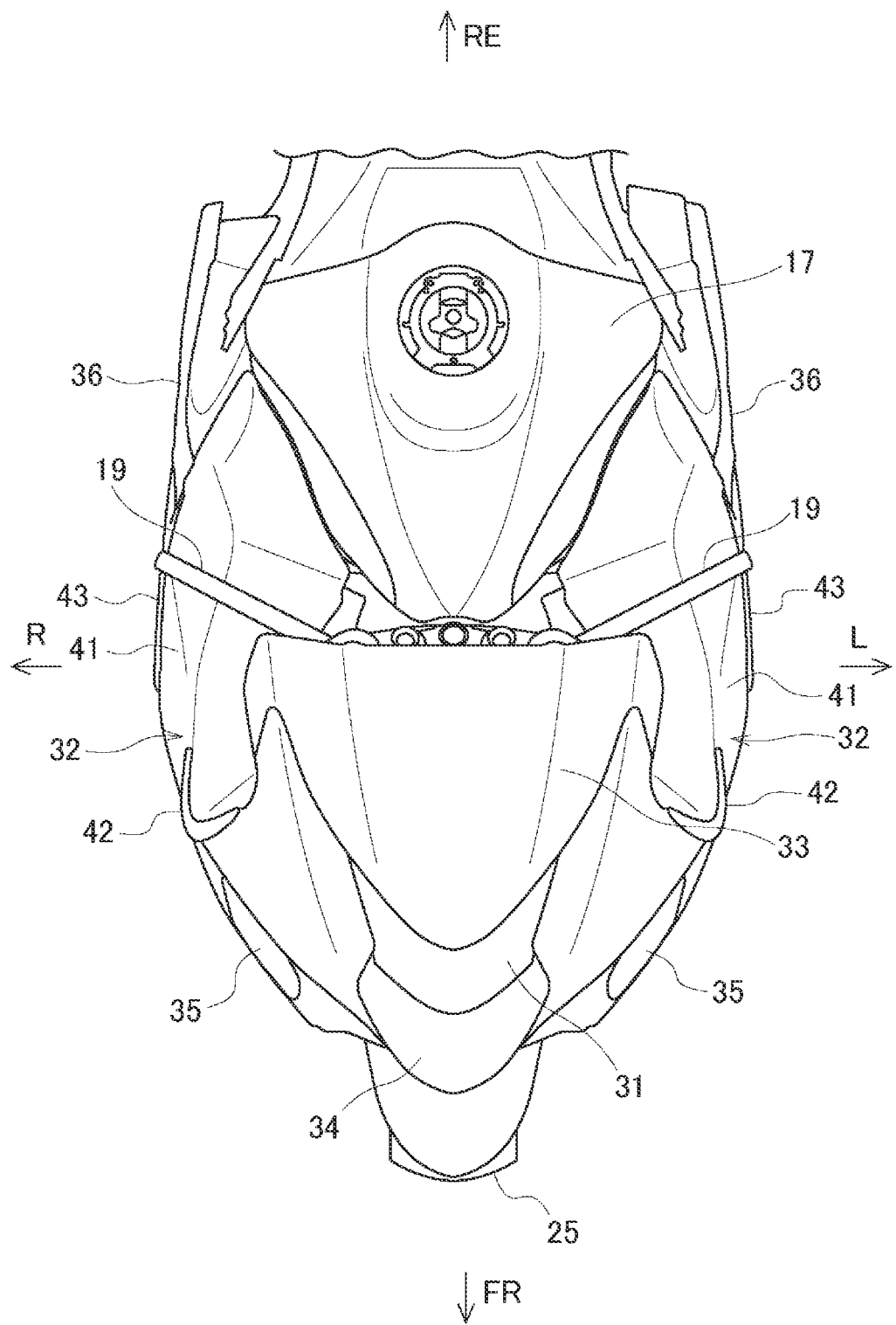
FIG. 3 is a top view of the vehicle front portion according to the present embodiment.
Figure 4:
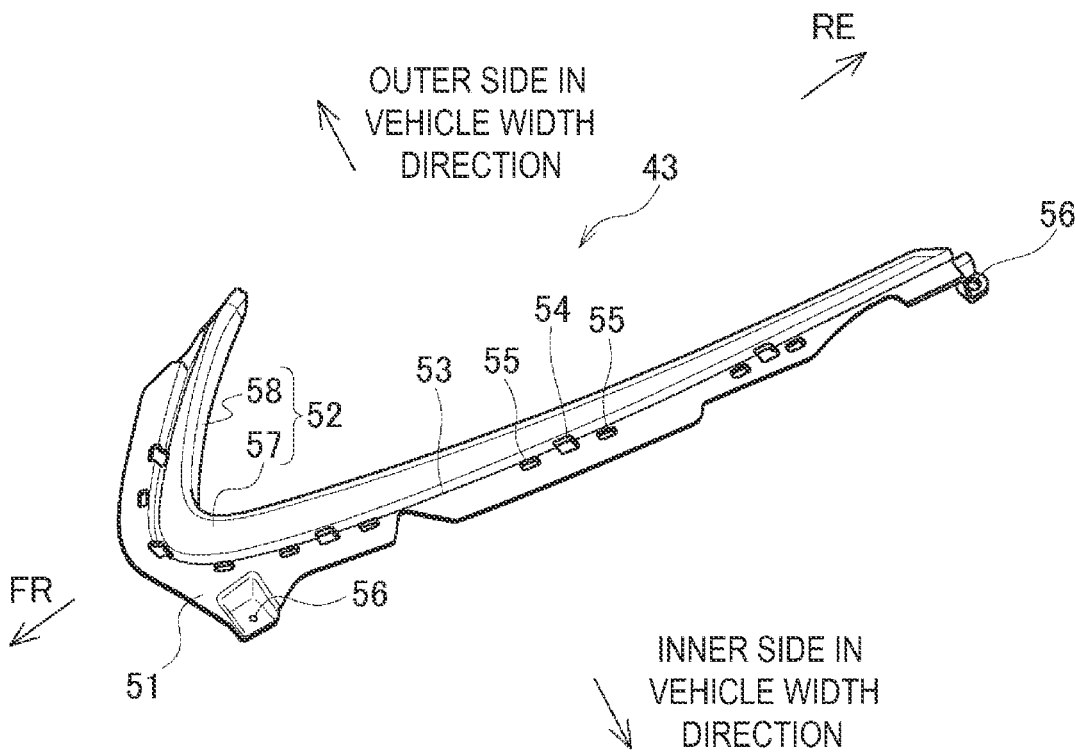
FIG. 4 is a perspective view of a rear edge cover of the present embodiment when viewed from a front surface side.
Figure 5:
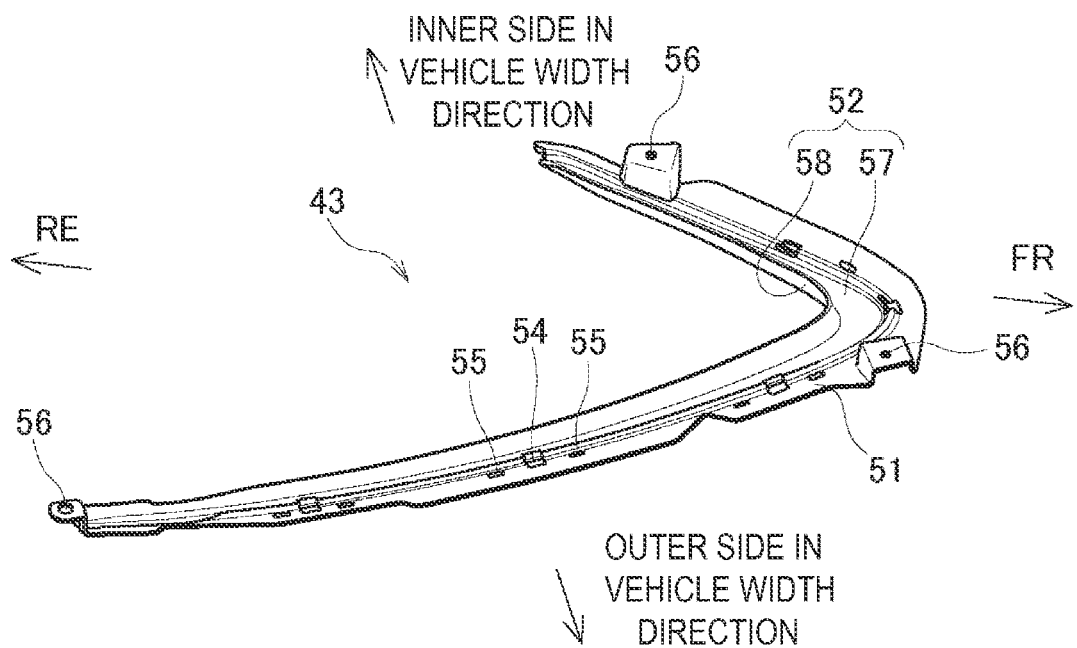
FIG. 5 is a perspective view of the rear edge cover of the present embodiment when viewed from a back surface side.
Figure 6:
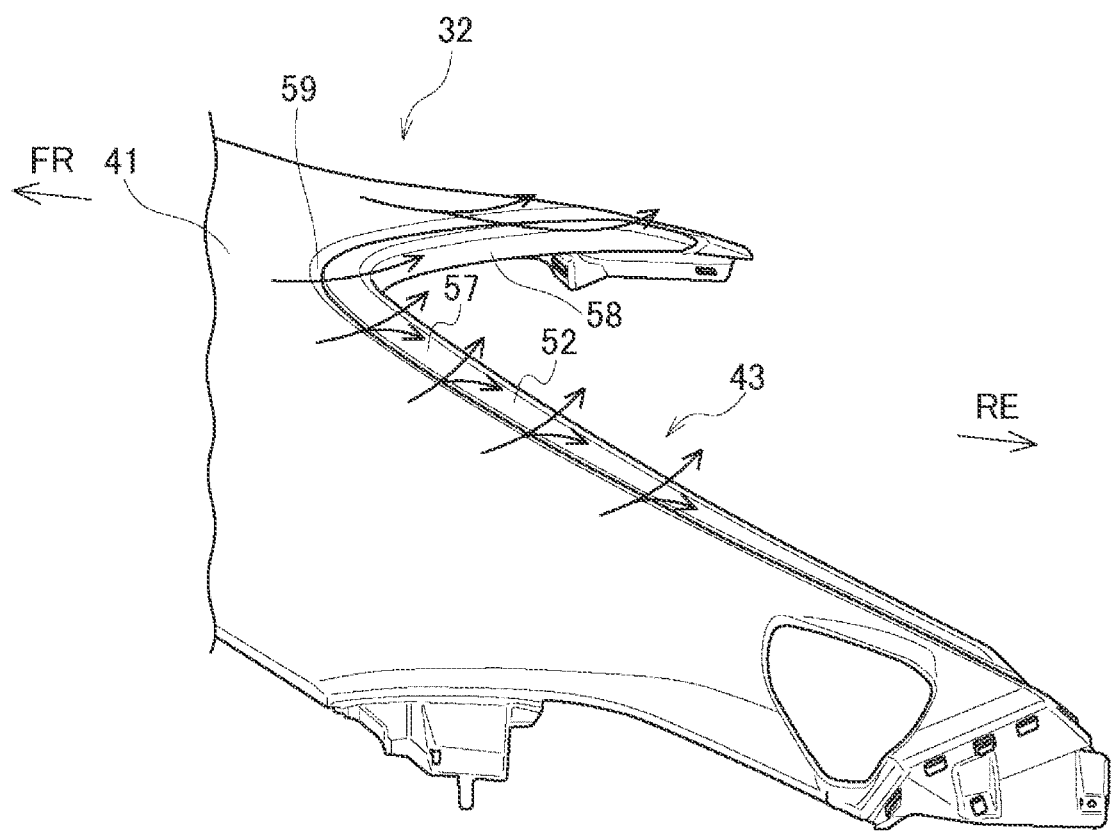
FIG. 6 is a perspective view of a vicinity of a rear end of a side cowl according to the present embodiment.
Figure 7:
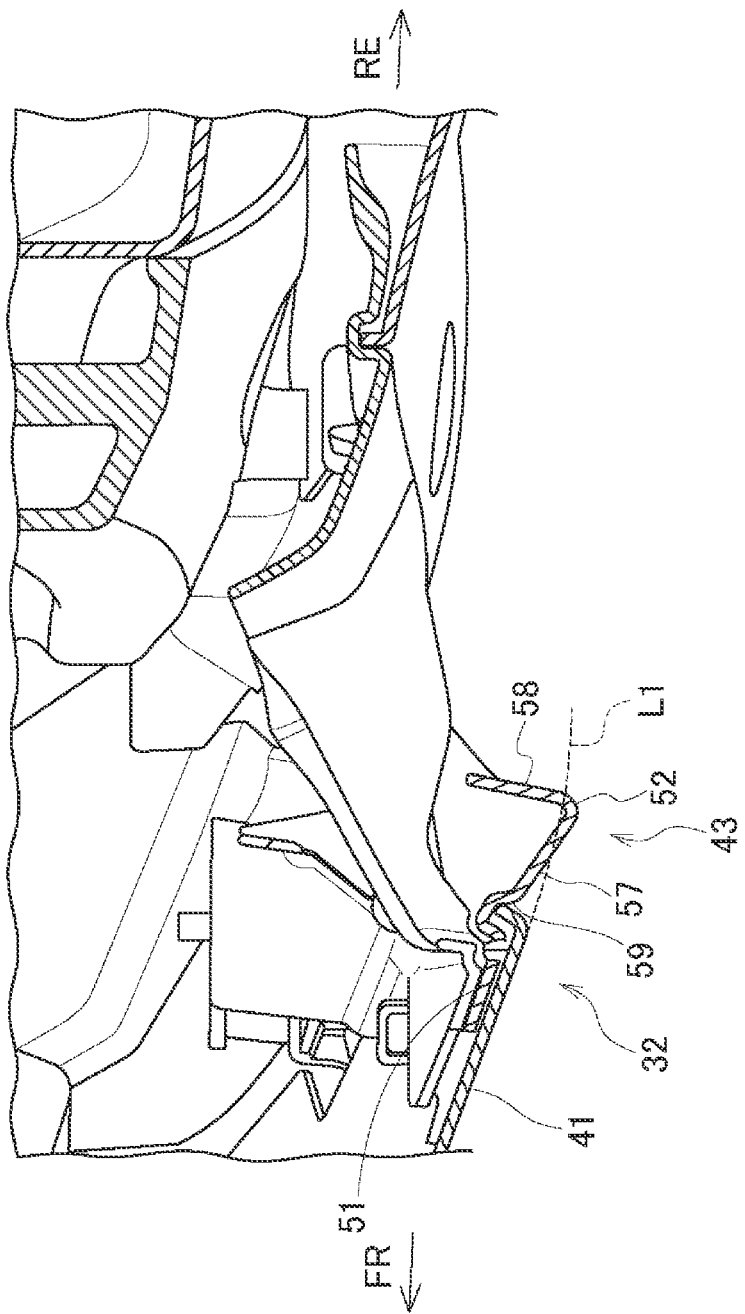
FIG. 7 is a cross-sectional view of a vicinity of a rear end of the rear edge cover according to the present embodiment.

Hereinafter, the side cowls of the saddle-ridden vehicle will be described with reference to FIGS. 2 to 7. FIG. 2 is a side view of the vehicle front portion according to the present embodiment. FIG. 3 is a top view of the vehicle front portion according to the present embodiment. FIG. 4 is a perspective view of the rear edge cover of the present embodiment when viewed from a front surface side. FIG. 5 is a perspective view of the rear edge cover of the present embodiment when viewed from a back surface side. FIG. 6 is a perspective view of a vicinity of a rear end of the side cowl according to the present embodiment. FIG. 7 is a cross-sectional view of a vicinity of a rear end of the rear edge cover according to the present embodiment.

As shown in FIGS. 2 and 3, the screen 33 is provided on the upper portion of the front cowl 31, and the pair of side cowls 32 that cover sides of the front forks 23 are provided on a left edge and a right edge of the front cowl 31. The front cowl 31 is formed to cover a base end side of the screen 33 and a periphery of a central headlamp 34. Turn signal lamps 35 are provided between the front cowl 31 and the pair of side cowls 32. A streamlined shape is formed by drawing an upward-gradient curve from a front end of the headlamp 34 toward a rear end of the screen 33 and drawing a curve that widens a vehicle width from the front end of the headlamp 34 toward rear ends of the side cowls 32.

A cowl main body 41 of the side cowl 32 extends from the front cowl 31 to a rear side of the vehicle. An upper edge of the cowl main body 41 is located in front of handlebars 19, and is inclined so as to draw a downward gradient toward the rear side of the vehicle when viewed in a vehicle side view. The upper edge cover 42 is provided on the upper edge of the cowl main body 41 along the upper edge. The upper edge cover 42 protrudes from an outer surface (a cowl outer surface) of the cowl main body 41, and directs the flow of the traveling wind along the outer surface of the cowl main body 41 toward the outer side in the vehicle width direction. The traveling wind is diffused in front of the handlebars 19 to soften the hitting of the traveling wind on the occupant.

A side cover 36 is provided on a rear side of the vehicle of the side cowl 32. A rear edge of the cowl main body 41 is cut out so as to draw an arc when viewed in the vehicle side view, and an air discharge port is formed between the side cowl 32 and the side cover 36. The rear edge of the cowl main body 41 defines an opening edge of the air discharge port, and the rear edge cover 43 is provided along the rear edge. The rear edge cover 43 protrudes from the outer surface of the cowl main body 41, and directs the flow of the traveling wind along the outer surface of the cowl main body 41 toward the outer side in the vehicle width direction. The traveling wind is diffused in front of the air discharge port to soften the hitting of the traveling wind on the occupant.

When the traveling wind flows from a front side to a rear side along the outer surface of the cowl main body 41, the traveling wind is most likely to be separated at a portion where the vehicle width is maximized. Therefore, the upper edge cover 42 is provided at an upper edge of an upper portion of the cowl main body 41, the upper edge having a maximum vehicle width in a vehicle front-rear direction, and the rear edge cover 43 is provided at a rear edge of a lower portion of the cowl main body 41, the rear edge having the maximum vehicle width in the vehicle front-rear direction. Since the upper edge cover 42 and the rear edge cover 43 are provided at the portions where the vehicle width is maximized, the traveling wind is effectively diffused, and the hitting of the traveling wind on the occupant is further softened.

The upper edge of the cowl main body 41 is reinforced by the upper edge cover 42, and the rear edge of the cowl main body 41 is reinforced by the rear edge cover 43. Particularly, since the rear edge cover 43 is provided along the opening edge of the air discharge port, rigidity of which is likely to be reduced by exhaust air heat, rigidity of the side cowl 32 is increased, and vibration and deflection are effectively prevented. Further, the air discharge port is provided with a louver member 37 that rectifies the traveling wind that has passed through an inner side of the side cowl 32. Since the side cowl 32 is coupled to the side cover 36 via the louver member 37, the rigidity of the side cowl 32 is increased.

As shown in FIGS. 4 and 5, the rear edge cover 43 is curved so as to draw an arc when viewed in the vehicle side view. The rear edge cover 43 includes a flat-plate-shaped attachment portion 51 attached to the rear edge of the cowl main body 41 (see FIG. 6), and an elongated convex portion 52 that bulges outward in the vehicle width direction. A shallow groove 53 recessed inward in the vehicle width direction is formed at a boundary portion between the attachment portion 51 and the convex portion 52. A plurality of locking holes 54 and a plurality of positioning holes 55 are formed in the rear edge cover 43 along the shallow groove 53. Further, a plurality of fixing holes 56 are formed near both end positions and a bent position of the rear edge cover 43.

A cross section of the convex portion 52 is formed in a V shape by a front side portion 57 that faces the front side of the vehicle and a rear side portion 58 that faces the rear side of the vehicle. The front side portion 57 of the convex portion 52 is inclined so as to widen the vehicle width toward the rear side of the vehicle, and the rear side portion 58 of the convex portion 52 extends inward in the vehicle width direction from a rear end of the front side portion 57 (see FIG. 7). The front side portion 57 is widened from both end positions of the rear edge cover 43 in a longitudinal direction toward the bent position, and the rear side portion 58 is widened from both ends of the rear edge cover 43 in the longitudinal direction toward the bent position. That is, the V-shaped cross section of the rear edge cover 43 at the bent position is the largest, and rigidity of the bent position is increased.

As shown in FIGS. 6 and 7, the attachment portion 51 of the rear edge cover 43 is attached to an inner side of the rear edge of the cowl main body 41, and the convex portion 52 of the rear edge cover 43 is exposed along the rear edge of the cowl main body 41. Since the convex portion 52 of the rear edge cover 43 is curved when viewed in the vehicle side view, the rigidity of the side cowl 32 is increased and deformation is prevented. Further, a width of the front side portion 57 of the convex portion 52 in an inclination direction is formed to be larger than a width of the rear side portion 58 of the convex portion 52 in the vehicle width direction (particularly, see FIG. 7). Accordingly, a width of the convex portion 52 in a front-rear direction is increased when viewed in the vehicle side view, and particularly, rigidity of the side cowl 32 against bending in the front-rear direction is increased.

A front edge of the front side portion 57 of the convex portion 52 enters an inner side in the vehicle width direction with respect to the outer surface of the cowl main body 41, and a rear edge of the front side portion 57 of the convex portion 52 protrudes outward in the vehicle width direction with respect to the outer surface of the cowl main body 41. Therefore, a step-shaped concave portion 59 recessed inward in the vehicle width direction is formed at a boundary between the convex portion 52 and the cowl main body 41. The inner side in the vehicle width direction with respect to the outer surface of the cowl main body 41 indicates an inner side in the vehicle width direction with respect to an extension line L1 (see FIG. 7) obtained by extending the outer surface of the cowl main body 41. The outer side in the vehicle width direction with respect to the outer surface of the cowl main body 41 indicates an outer side in the vehicle width direction with respect to the extension line L1 obtained by extending the outer surface of the cowl main body 41.

The concave portion 59 and the convex portion 52 are formed in a non-streamlined shape for the flow of the traveling wind along the outer surface of the cowl main body 41, and the traveling wind is easily separated from the outer surface of the cowl main body 41 at the concave portion 59 and the convex portion 52. Particularly, since a width of the inclined front side portion 57 of the convex portion 52 is large, the traveling wind hits the front side portion 57 and is repelled outward in the vehicle width direction to be easily separated. Further, since the rear side portion 58 is bent at an acute angle with respect to the front side portion 57 of the convex portion 52, the traveling wind is easily separated at the bent portion. When viewed in a vehicle top view, the traveling wind is separated so as to extend outward in the vehicle width direction toward the rear side of the vehicle, and the hitting of the traveling wind on the occupant is softened.

Since the concave portion 59 is provided at the boundary between the cowl main body 41 and the convex portion 52, a height difference between the concave portion 59 and the convex portion 52 necessary for separating the traveling wind is secured. As compared with a configuration in which a height difference necessary for separating the traveling wind is secured only by the convex portion 52 without providing the concave portion 59, a protrusion amount of the convex portion 52 from the outer surface of the cowl main body 41 is reduced. Therefore, even when the rear edge cover 43 is provided on the cowl main body 41, an increase in a dimension of the saddle-ridden vehicle 1 (see FIG. 1) in the vehicle width direction is minimized. Since the protrusion amount of the convex portion 52 from the outer surface of the cowl main body 41 is small and the front side portion 57 of the convex portion 52 is inclined, an air resistance received by the convex portion 52 from the traveling wind is not fairly increased.

When viewed in the vehicle side view, the convex portion 52 is curved so as to draw an arc in front of the vehicle, and an intermediate portion of the convex portion 52 in a longitudinal direction protrudes toward the front side of the vehicle. An upper half portion of the convex portion 52 is inclined at an upward gradient toward the rear side of the vehicle, and a lower half portion of the convex portion 52 is inclined at a downward gradient toward the rear side of the vehicle (see FIG. 2). The traveling wind easily flows along an extending direction of the convex portion 52, and the traveling wind is diffused in the upper-lower direction, so that the hitting of the traveling wind on the occupant is softened. The traveling wind that hits the convex portion 52 escapes obliquely upward and obliquely downward, so that the air resistance received by the convex portion 52 from the traveling wind is reduced. When viewed in the vehicle side view, the convex portion 52 may be curved in a V shape with a top portion facing the front side of the vehicle.

Although not shown, the upper edge cover 42 is formed in the same manner as the rear edge cover 43. That is, the rear edge cover 43 includes a flat-plate-shaped attachment portion and a V-shaped convex portion in a cross-sectional view. The upper edge cover 42 is attached to the rear edge of the cowl main body 41, and a step-shaped concave portion is formed at a boundary between the cowl main body 41 and a convex portion of the upper edge cover 42. The convex portion of the upper edge cover 42 is curved at a downward gradient toward the rear side of the vehicle. Accordingly, the upper edge cover 42 softens the hitting of the traveling wind on the occupant, and the air resistance of the upper edge cover 42 is prevented.

Since the rear edge cover 43 and the upper edge cover 42 are attached to the cowl main body 41 in this way, the traveling wind is diffused in the vehicle width direction and the upper-lower direction by the rear edge cover 43 and the convex portion 52 of the upper edge cover 42. Since the cowl main body 41, the rear edge cover 43, and the upper edge cover 42 are separately formed, a degree of freedom in designing the shape and the protrusion amount of the convex portion 52 is improved, and the shape of the cowl main body 41 becomes simple and easy to form. Further, since colors of the cowl main body 41, the rear edge cover 43, and the upper edge cover 42 are changed, the side cowl 32 is accented and an appearance is improved.

Figure 8A:
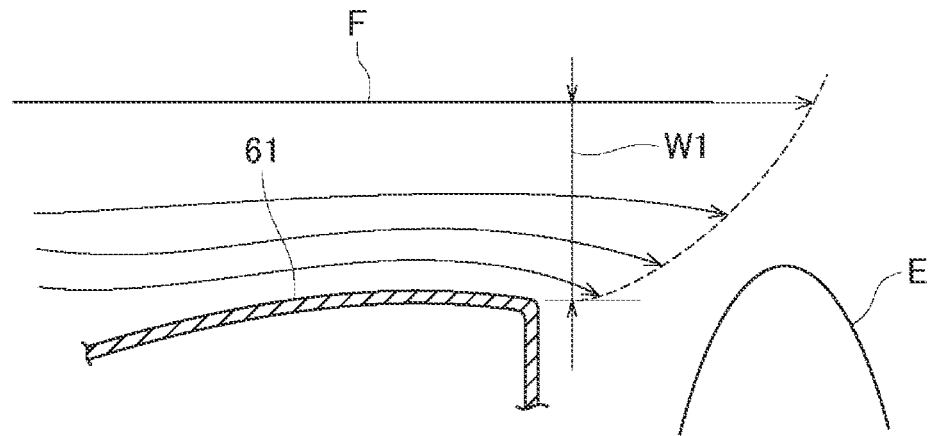
FIGS. 8A to 8C are diagrams showing wind speed distributions of traveling wind on outer surfaces of side cowls.
Figure 8B:
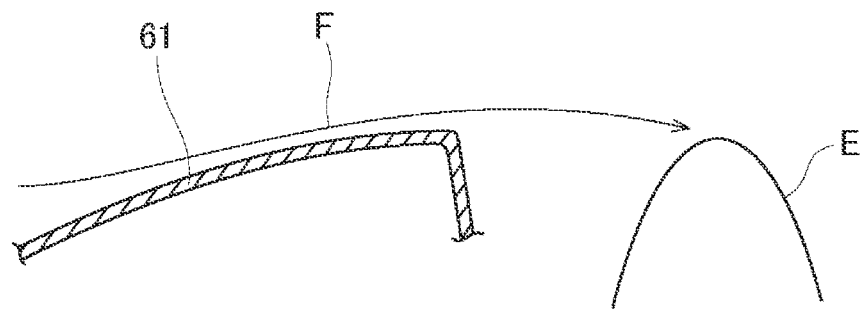
Figure 8C:
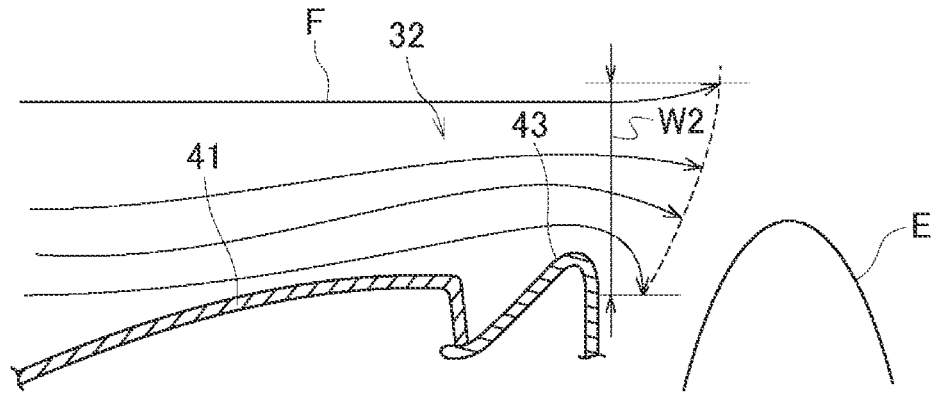

The flow of the traveling wind on the outer surface of the side cowl will be described with reference to FIGS. 8A to 8C. FIGS. 8A to 8C are diagrams showing wind speed distributions of the traveling wind on outer surfaces of side cowls. FIGS. 8A and 8B show a wind speed distribution of traveling wind on a side cowl of a comparative example, and FIG. 8C shows the wind speed distribution of the traveling wind on the side cowl of the present embodiment. Here, a wind speed distribution of the traveling wind in the vicinity of the rear edge cover is shown, but a wind speed distribution of the traveling wind in the vicinity of the upper edge cover is also the same.

As shown in FIG. 8A, a side cowl 61 of the comparative example is not provided with a rear edge cover. When the vehicle travels, traveling wind F flows along an outer surface of the side cowl 61, and the flow of the traveling wind F is separated by a rear edge of the side cowl 61. The traveling wind F is separated from the rear edge of the side cowl 61, but a spreading width W1 of the traveling wind F does not increase. As a distance from the outer surface of the side cowl 61 increases, a wind speed rapidly increases, and there is a large difference between a wind speed in the vicinity of the outer surface of the side cowl 61 and a wind speed at a position far from the outer surface of the side cowl 61. When the traveling wind F hits an elbow E of the occupant, a difference in a wind pressure received by an inner side and an outer side of the elbow E in the vehicle width direction becomes large, and the occupant is likely to feel uncomfortable.

in this way, the traveling wind F separated from the side cowl 61 is not diffused, and the traveling wind F directly hits the elbow E of the occupant. Particularly, as shown in FIG. 8B, when a boundary of the traveling wind F coincides with a tip end of the elbow E, the traveling wind F concentrates on the tip end of the elbow E, and the tip end of the elbow E receives a strong wind pressure. Therefore, since the elbow E locally receives the strong wind pressure, the traveling wind F hinders a handlebars operation by the occupant during high-speed traveling. Here, an example in which the elbow E of the occupant receives the wind pressure is described, but other portions such as a knee, a thigh, and a shin that protrude from the side cowl 61 also strongly receive the wind pressure.

On the contrary, as shown in FIG. 8C, the side cowl 32 of the present embodiment is provided with the rear edge cover 43 on the cowl main body 41. When the vehicle travels, the traveling wind F flows along the outer surface of the cowl main body 41, and the flow of the traveling wind F is separated by the rear edge cover 43. The traveling wind F is diffused behind the rear edge cover 43, and a spreading width W2 of the traveling wind F increases. Since the wind speed gradually increases as the distance from the outer surface of the cowl main body 41 increases, there is no large difference between a wind speed in the vicinity of the outer surface of the cowl main body 41 and a wind speed at a position far from the outer surface of the cowl main body 41. When the traveling wind F hits the elbow E of the occupant, the difference in the wind pressure received by the inner side and the outer side of the elbow E in the vehicle width direction becomes small, and the occupant is less likely to feel uncomfortable. That is, the occupant does not locally receive a strong wind pressure, and the traveling wind does not hinder the handlebars operation.

As described above, according to the present embodiment, the flow of the traveling wind F along the outer surface of the side cowl 32 is separated by the rear edge cover 43 and the upper edge cover 42. Since the traveling wind F is diffused outward in the vehicle width direction behind the rear edge cover 43 and the upper edge cover 42, the hitting of the traveling wind F on a portion of the occupant that protrudes from the side cowl 32 is softened. The air resistance is reduced by the side cowl 32, traveling is stabilized, the strong local wind pressure on the occupant is prevented, and comfort during driving is not impaired.

Figure 9:
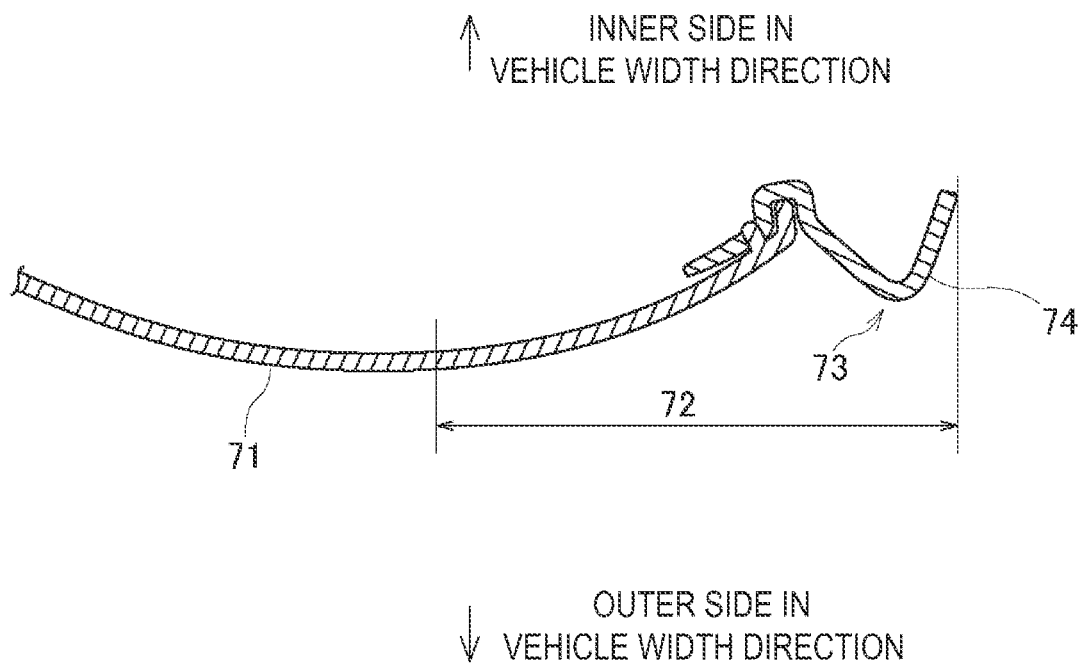
FIG. 9 is a cross-sectional view of a vicinity of a rear end of a rear edge cover according to a modification.

In the present embodiment, the rear edge cover is provided at a portion of the cowl main body where the vehicle width is maximized in the vehicle front-rear direction, but the rear edge cover may be provided at another portion. For example, as shown in FIG. 9, a narrow region 72 where a vehicle width narrows toward a rear side of a vehicle may be formed on an outer surface of a cowl main body 71, and a rear edge cover 73 may be provided in the narrow region 72. The rear edge cover 73 may be provided at the rear side of the narrow region 72. Accordingly, even when a protrusion amount of a convex portion 74 of the rear edge cover 73 is increased, the vehicle width can be suppressed, and the flow of the traveling wind is more easily separated by the convex portion 74 that fairly protrudes from the outer surface of the cowl main body 71. Similarly, an upper edge cover may be provided in the narrow region or at the rear side of the narrow region.

In the present embodiment, the rear edge cover and the upper edge cover are provided on the cowl main body, and the convex portions are formed on the rear edge cover and the upper edge cover, but the convex portion may be formed on the cowl main body. Accordingly, the number of components can be reduced.

In the present embodiment, both the rear edge cover and the upper edge cover are provided on the cowl main body, but any one of the rear edge cover and the upper edge cover may be provided on the cowl main body.

In the present embodiment, the cross sections of the convex portions of the rear edge cover and the upper edge cover are formed in the V shape, but the cross-sectional shapes of the convex portions are not particularly limited. The convex portions may be formed so as to protrude outward in the vehicle width direction from the outer surface of the cowl main body.

In the present embodiment, the convex portion is formed on the rear edge cover of the rear edge of the cowl main body, and the convex portion is formed on the upper edge cover of the upper edge of the cowl main body, but the convex portions may be provided on a downstream side of the traveling wind that flows on the outer surface of the side cowl.

In the present embodiment, the convex portions of the rear edge cover and the upper edge cover are curved so as to draw an arc when viewed in the vehicle side view, but the convex portions may be formed linearly.

In the present embodiment, the concave portion is formed at the boundary between the cowl main body and the rear edge cover, but the concave portion may not be formed at the boundary between the cowl main body and the rear edge cover. Similarly, the concave portion may not be formed at the boundary between the cowl main body and the upper edge cover. Even with such a configuration, it is possible to soften the hitting of the traveling wind on the portion of the occupant that protrudes from the side cowl.

The side cowl of the saddle-ridden vehicle of the present embodiment is not limited to a motorcycle of a tourer type, and may be adopted in a motorcycle of another type. Further, the saddle-ridden vehicle is not limited to all vehicles where the occupant rides in a posture of straddling a seat, and also includes a vehicle of a scooter type where the occupant rides without straddling a seat.

As described above, the side cowl (32) of the present embodiment is the side cowl that covers the vehicle side portion of the saddle-ridden vehicle (1), and the convex portion (52) that elongates in the upper-lower direction and protrudes outward in the vehicle width direction with respect to the cowl outer surface is formed on the downstream side of the traveling wind that flows on the cowl outer surface. According to this configuration, the flow of the traveling wind along the cowl outer surface is separated by the convex portion. Since the traveling wind is diffused behind the convex portion, the hitting of the traveling wind on the portion of the occupant that protrudes from the side cowl is softened. The air resistance is reduced by the side cowl, traveling is stabilized, the strong local wind pressure on the occupant is prevented, and comfort during driving is not impaired.

In the side cowl of the present embodiment, the convex portion is formed at a portion of the cowl outer surface where the vehicle width is maximized in the vehicle front-rear direction. According to this configuration, the flow of the traveling wind can be separated by the convex portion at the most easily separable portion of the cowl outer surface.

In the side cowl of the present embodiment, the cowl outer surface includes the narrow region (72) where the vehicle width narrows toward the rear side of the vehicle, and the convex portion is formed in the narrow region or at the rear side of the narrow region. According to this configuration, the vehicle width can be suppressed even when the protrusion amount of the convex portion is increased, and the flow of the traveling wind along the cowl outer surface is more easily separated by the convex portion that fairly protrudes from the cowl outer surface.

In the side cowl of the present embodiment, the concave portion (59) recessed inward in the vehicle width direction is formed at the boundary between the cowl outer surface and the convex portion. According to this configuration, the flow of the traveling wind along the cowl outer surface is more easily separated by the concave portion and the convex portion.

In the side cowl of the present embodiment, the convex portion is curved when viewed in the vehicle side view. According to this configuration, the rigidity of the side cowl is increased by the curved convex portion, and deformation of the side cowl is prevented.

In the side cowl of the present embodiment, when viewed in the vehicle side view, the intermediate portion of the convex portion in the longitudinal direction is curved so as to protrude toward the front side of the vehicle. According to this configuration, the traveling wind is diffused in the upper-lower direction along the convex portion, and the hitting of the traveling wind on the occupant is softened.

In the side cowl of the present embodiment, the rear edge of the cowl outer surface defines the opening edge of the air discharge port, and the convex portion is formed along the rear edge of the cowl outer surface. According to this configuration, the traveling wind is diffused in front of the air discharge port, and the hitting of the traveling wind on the occupant is softened. Since the convex portion is provided along the opening edge of the air discharge port that is relatively likely to vibrate, the rigidity of the side cowl is increased, and deflection is prevented.

In the side cowl of the present embodiment, an upper edge of the cowl outer surface is located in front of the handlebars (19), and the convex portion is formed along the upper edge of the cowl outer surface. According to this configuration, the traveling wind is diffused in front of the handlebars, and the hitting of the running wind on the occupant is softened.

In the side cowl of the present embodiment, the cross section of the convex portion is formed in the V shape by the front side portion (57) facing the front side of the vehicle and the rear side portion (58) facing the rear side of the vehicle. According to this configuration, the rigidity of the side cowl is increased by the V-shaped cross section of the convex portion, and deformation of the side cowl is prevented.

In the side cowl of the present embodiment, the front side portion is inclined so as to widen the vehicle width toward the rear side of the vehicle, the rear side extends inward in the vehicle width direction from the rear end of the front side portion, and the width of the front side portion in the inclination direction is larger than the width of the rear side portion in the vehicle width direction. According to this configuration, the width of the front side portion of the convex portion is formed to be wide, so that the width of the convex portion in a front-rear direction is increased when viewed in the vehicle side view, and particularly, the rigidity against deformation of the side cowl in the front-rear direction is increased.

Although the present embodiment has been described, the above-described embodiment and modifications may be combined entirely or partially as another embodiment.

The technique of the present invention is not limited to the above-described embodiment, and various changes, substitutions, and modifications may be made without departing from the spirit of the technical concept of the present invention. Further, the present invention may be implemented using other methods as long as the technical concept can be implemented by the methods through advance of the technology or other derivative technology. Therefore, the claims cover all embodiments that may be included within the scope of the technical concept.

What is claimed is:

1. A side cowl configured to cover a vehicle side portion of a saddle-ridden vehicle, comprising:
    a convex portion, elongating in an upper-lower direction, protruding outward in a vehicle width direction with respect to a cowl outer surface, and formed on the cowl outer surface at a downstream side of traveling wind that flows on the cowl outer surface wherein,
    when viewed in a vehicle side view, an upper half portion of the convex portion is inclined at an upward gradient toward a rear side of the vehicle, and a lower half portion of the convex portion is inclined at a downward gradient toward the rear side of the vehicle.
2. The side cowl according to claim 1, wherein
    the convex portion is formed at a portion of the cowl outer surface where a vehicle width is maximized in a vehicle front-rear direction.
3. The side cowl according to claim 1, wherein
    the cowl outer surface includes a narrow region where a vehicle width narrows toward a rear side of a vehicle, and
    the convex portion is formed in the narrow region or at a rear side of the narrow region.
4. The side cowl according to claim 1, wherein
    a concave portion recessed inward in a vehicle width direction is formed at a boundary between the cowl outer surface and the convex portion.
5. The side cowl according to claim 1, wherein
    a rear edge of the cowl outer surface defines as an opening edge of an air discharge port, and
    the convex portion is formed along the rear edge of the cowl outer surface.
6. The side cowl according to claim 1, wherein
    a cross section of the convex portion is formed in a V shape by a front side portion facing a front side of a vehicle and a rear side portion facing a rear side of the vehicle.
7. The side cowl according to claim 6, wherein
    the front side portion is inclined so as to widen a vehicle width toward a rear side of a vehicle, and the rear side portion extends inward in a vehicle width direction from a rear end of the front side portion, and
    a width of the front side portion in an inclination direction is larger than a width of the rear side portion in a vehicle width direction.
8. A side cowl configured to cover a vehicle side portion of a saddle-ridden vehicle, comprising:
    a convex portion, elongating in an upper-lower direction, protruding outward in a vehicle width direction with respect to a cowl outer surface, and formed on the cowl outer surface at a downstream side of traveling wind that flows on the cowl outer surface, wherein an upper edge of the cowl outer surface is located in front of handlebars, and is inclined so as to draw a downward gradient toward a rear side of the vehicle when viewed in a vehicle side view, and the convex portion is formed so as to extend so as to draw a downward gradient toward the rear side of the vehicle along the upper edge of the cowl outer surface.

9. The side cowl according to claim 8, wherein, when viewed in the vehicle side view, an upper end of the convex portion is located in front of an outer edge in the vehicle width direction of the handlebars and is located in an upper position than the outer edge of the handlebars, and a lower end of the convex portion is located in front of the outer edge of the handlebars and is located in a lower position than the outer edge of the handlebars.

\* \* \* \* \*